United States Patent
Osuki

(10) Patent No.: US 11,061,631 B2
(45) Date of Patent: Jul. 13, 2021

(54) IMAGE FORMING APPARATUS, METHOD OF CONTROLLING IMAGE FORMING APPARATUS, AND STORAGE MEDIUM FOR DETECTING A STATE OF A CONSUMABLE AND A STATE OF A SERVICE TO ORDER THE CONSUMABLE

(71) Applicant: CANON KABUSHIKI KAISHA, Tokyo (JP)

(72) Inventor: Takashi Osuki, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/785,382

(22) Filed: Feb. 7, 2020

(65) Prior Publication Data

US 2020/0278818 A1 Sep. 3, 2020

(30) Foreign Application Priority Data

Feb. 28, 2019 (JP) .............................. JP2019-036853

(51) Int. Cl.
*G06F 3/12* (2006.01)
*G06Q 10/08* (2012.01)

(52) U.S. Cl.
CPC ............ *G06F 3/1229* (2013.01); *G06F 3/121* (2013.01); *G06F 3/1219* (2013.01); *G06F 3/1256* (2013.01); *G06Q 10/087* (2013.01)

(58) Field of Classification Search
None
See application file for complete search history.

(56) References Cited

U.S. PATENT DOCUMENTS

| 2015/0293725 | A1* | 10/2015 | Yoshihara | G06F 3/126 358/1.15 |
| 2017/0090830 | A1* | 3/2017 | Tomono | G06F 3/1235 |
| 2018/0165751 | A1* | 6/2018 | Chiyo | G06F 3/1235 |
| 2018/0167520 | A1* | 6/2018 | Jimbo | G06F 3/1203 |
| 2018/0240179 | A1* | 8/2018 | Yamamoto | G06Q 30/0633 |
| 2018/0241833 | A1* | 8/2018 | Hachiya | H04L 67/146 |
| 2019/0146733 | A1* | 5/2019 | Park | G06Q 10/10 358/1.15 |
| 2019/0275803 | A1* | 9/2019 | Miyazawa | B41J 2/17566 |
| 2020/0201230 | A1* | 6/2020 | Ohta | G03G 15/556 |
| 2020/0225885 | A1* | 7/2020 | Akimoto | G06F 3/1219 |

FOREIGN PATENT DOCUMENTS

JP    2018-136637 A    8/2018

* cited by examiner

*Primary Examiner* — Henok Shiferaw
(74) *Attorney, Agent, or Firm* — Canon U.S.A., Inc. IP Division

(57) ABSTRACT

An image forming apparatus is provided. The image forming apparatus communicates with a server that includes an acquisition unit configured to acquire a state of a consumable of the image forming apparatus, a transmission unit configured to transmit a notification based on the state of the consumable that is acquired by the acquisition unit, to the server, and a setting unit configured to make a setting as to whether to use a service that orders the consumable based on the state of the consumable, wherein if the service is enabled by the setting unit, the transmission unit transmits the notification based on the state of the consumable that is acquired by the acquisition unit, to the server.

18 Claims, 11 Drawing Sheets

FIG.4

| PRINTER ID | USER ID | SERIAL NUMBER OF PRINTER | SERVICE STATE |
|---|---|---|---|
| 123456789 | abc123 | xxxxyyyy | ENABLED |
| 222222222 | xyz789 | abcdabcd | DISABLED |
| ... | ... | ... | ... |

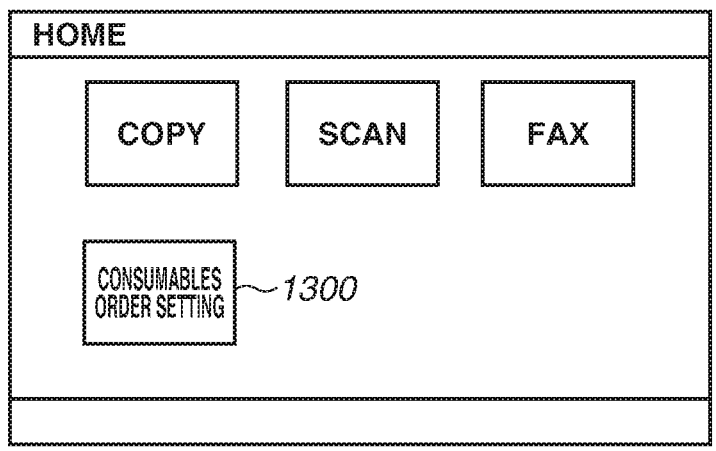
FIG.5A
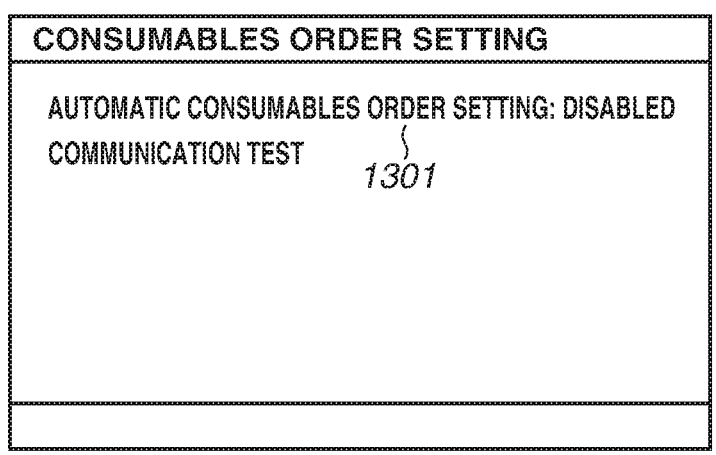
FIG.5B
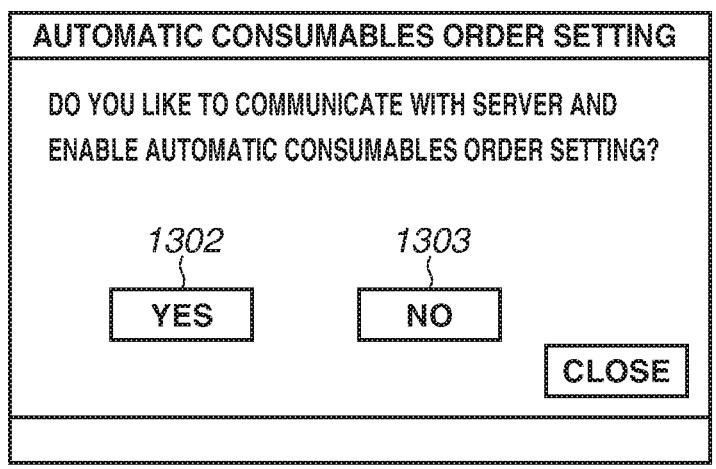
FIG.5C
FIG.5D
| SERVICE SETTING | APPLICATION ID | SERVICE ENABLING RESULT |
|---|---|---|
| ON | abc123 | SUCCESSFUL |

FIG.10

DO YOU LIKE TO NOTIFY SERVER OF
TONER REMAINING AMOUNT INFORMATION
ABOUT CURRENTLY-ATTACHED CARTRIDGE?
(ORDER FOR CONSUMABLE WILL BE PLACED)

YES
1001

NO
1002

IMAGE FORMING APPARATUS, METHOD OF CONTROLLING IMAGE FORMING APPARATUS, AND STORAGE MEDIUM FOR DETECTING A STATE OF A CONSUMABLE AND A STATE OF A SERVICE TO ORDER THE CONSUMABLE

BACKGROUND

Field

The present disclosure relates to an image forming apparatus, a method of controlling an image forming apparatus, an image forming system, and a storage medium.

Description of the Related Art

An image forming apparatus uses a plurality of consumables including recording agents for forming an image on a recording medium, such as toners and inks, and rollers for conveying a sheet in the image forming apparatus. A user of the image forming apparatus needs to order the consumables for replacement or request a service center to replace the consumables. An automatic order service of consumables is known and reduces the work which the user needs to do when purchasing the consumables. Specifically, an order for a consumable is automatically transmitted to a preset order destination in a case where the remaining amount of the consumable becomes less than or equal to a predetermined threshold value or based on the number of times or the length of time the consumable is used after replacement.

Japanese Patent Application Laid-Open No. 2018-136637 discusses an automatic order system for consumables in which the remaining amount of toner is detected at a timing that a print job is completed after an automatic order service of the toner is enabled. In a case where the detected remaining amount of toner is less than or equal to the threshold value, a management server transmits an order for the toner to a preset supplier. This reduces the work that the user needs to do when ordering the consumable, such as preparation of an order form and contact with a service center.

There are cases where replacement of the consumable is already necessary at a timing that the user operates the image forming apparatus to enable the automatic order service of the consumable. As an example, there is a case where the remaining amount of toner is already small when the automatic order service of the toner is enabled. At this time, if the image forming apparatus waits for the next acquisition of the state of the consumable and an automatic order for the consumable is transmitted based on information about the acquired state of the consumable, the time from when the user enables the automatic order service of the consumable to when the order for the consumable is transmitted, becomes long.

SUMMARY

According to an aspect of the present disclosure, an image forming apparatus that communicates with a server includes an acquisition unit configured to acquire a state of a consumable of the image forming apparatus, a transmission unit configured to transmit a notification based on the state of the consumable that is acquired by the acquisition unit, to the server, and a setting unit configured to make a setting as to whether to use a service that orders the consumable based on the state of the consumable, wherein if the service is enabled by the setting unit, the transmission unit transmits the notification based on the state of the consumable that is acquired by the acquisition unit, to the server.

Further features of the present disclosure will become apparent from the following description of exemplary embodiments with reference to the attached drawings.

BRIEF DESCRIPTION OF THE DRAWINGS

FIG. 4 illustrates an example of an order information table that is managed by a server according to an exemplary embodiment of the present disclosure.

FIGS. 5A to 5D illustrate an example of a screen that is displayed on an operation unit of the MFP and an example of a service setting information table that is managed by a MFP 101 according to an exemplary embodiment of the present disclosure.

FIG. 10 illustrates an example of a screen via which whether or not to allow notification of information to the server is selected, according to the second exemplary embodiment.

DESCRIPTION OF THE EMBODIMENTS

A first exemplary embodiment of the present disclosure will be described below with reference to the drawings.

In the present exemplary embodiment, a multi-function peripheral (MFP) that has print, scan, and fax functions will be described as an example of an image processing apparatus.

It should be noted that the below-described exemplary embodiments are not intended to limit the scope of the claimed disclosure and that not every combination of features described in the exemplary embodiments is always essential to a technical solution of the disclosure.

Figure 1:
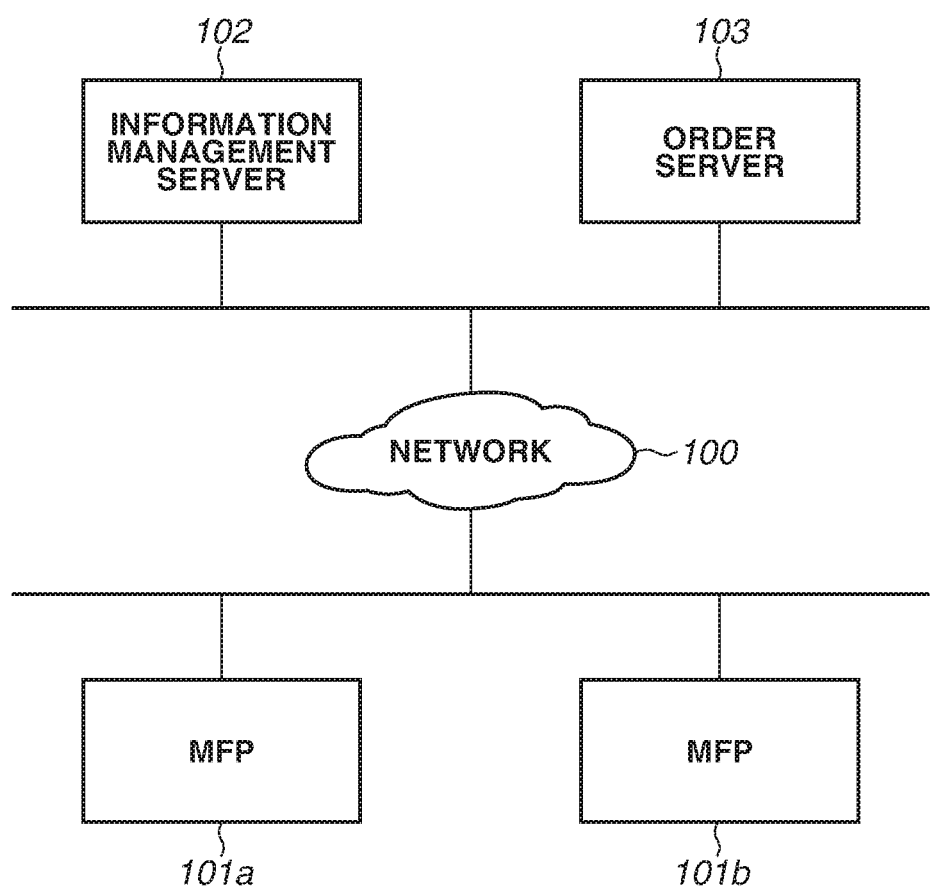
FIG. 1 illustrates an example of a configuration of an entire system according to an exemplary embodiment of the present disclosure.

FIG. 1 is a block diagram illustrating an image forming system according to the present exemplary embodiment. Multi-function peripherals (MFPs) 101a and 101b and an information management server 102 are communicably connected via a network 100. The MFPs 101a and 101b can be of the same type or different types. Further, in the present exemplary embodiment, the information management server 102 and an order server 103 are connected via the network 100.

Hereinafter, the MFP 101a will be referred to as "MFP 101".

The information management server 102 stores an application information table 400. The application information table 400 specifies contract information about a service to be used by the MFP 101 as a client for each MFP. Details of the application information table 400 will be described below with reference to FIG. 4. In the present exemplary embodiment, the information management server 102 stores information about a MFP which is under a contract for an automatic order service of toner that is one of consumables. Further, the information management server 102 executes processing that relates to service enabling for the MFP 101.

In the present exemplary embodiment, the information management server 102 is a cloud service consisting of a plurality of servers. Whether the information management server 102 consists of a single server machine or a plurality of servers is not limited in the present exemplary embodiment. Further, the MFP 101 and the information management server 102 can be on the same network.

The order server 103 is a server configured to receive an order for a consumable based on access from the information management server 102. In the present exemplary embodiment, in a case where the MFP 101 determines that a consumable needs to be replaced, the MFP 101 notifies an event to the information management server 102. The information management server 102 transmits a consumables order request to the order server 103 based on the event information notified from the MFP 101. For example, the MFP 101 detects the event where the remaining amount of a toner for use in printing becomes less than a threshold value, and the MFP 101 notifies a toner-low event to the information management server 102. The information management server 102 transmits an order for a toner cartridge of the toner that becomes small in remaining amount to the order server 103 based on the toner-low event notification. The consumables to be ordered can also be a development unit that includes a roller or a photosensitive drum. Further, in a case where a consumable to be ordered is a consumable that needs to be installed by a service engineer, the information management server 102 can transmit an order for the consumable together with a notification that a service engineer is needed.

Figure 2:
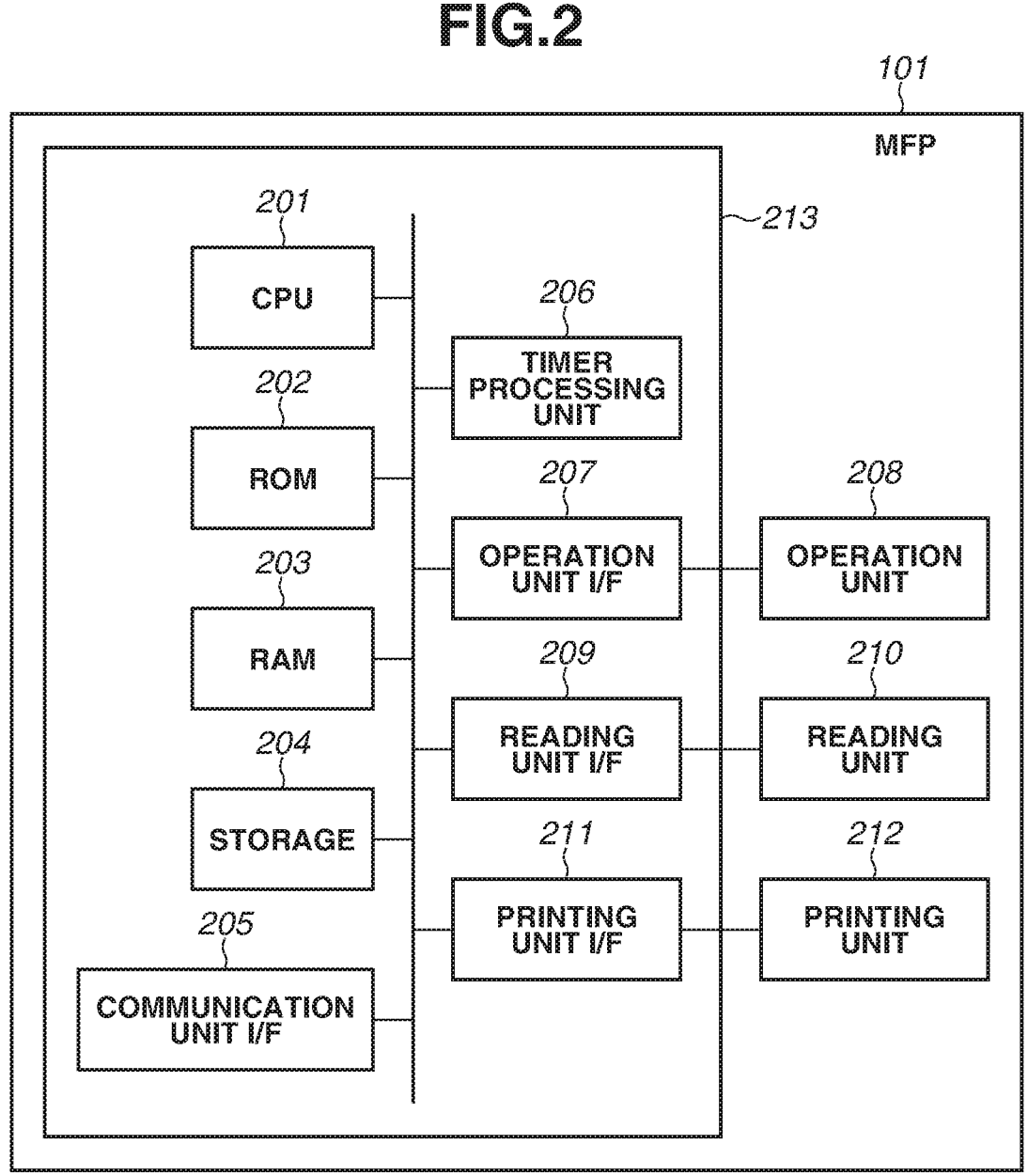
FIG. 2 illustrates an example of a hardware configuration of a multi-function peripheral (MFP) according to an exemplary embodiment of the present disclosure.

FIG. 2 is a block diagram illustrating a hardware configuration of the MFP 101 according to the present exemplary embodiment. The MFP 101 has a function of reading an image on a sheet and a function of printing an image on a sheet. Besides the above-described functions, the MFP 101 further has a file transmission function of transmitting image data to an external apparatus.

While the MFP 101 is described as the image processing apparatus in the present exemplary embodiment, the image processing apparatus is not limited to the MFP 101. For example, a printing apparatus such as a printer that does not have the reading function can be used as the image processing apparatus. Further, in a case where a consumable to be ordered is a consumable for a reading unit 210, an image reading apparatus such as a scanner that does not have the print function can be used.

A control unit 213 is a main controller of the MFP 101 and includes a central processing unit (CPU) 201, a read-only memory (ROM) 202, a random access memory (RAM) 203, a storage 204, and a tinier processing unit 206. The control unit 213 further includes a communication unit interface (I/F) 205 for communication with an external apparatus, an operation unit I/F 207, a reading unit IX 209, and a printing unit I/F 211.

The CPU 201 is a processor configured to control operations of the entire MFP 101. The CPU 201 reads a control program stored in the ROM 202 or the storage 204 and performs various types of control including reading control and printing control.

The ROM 202 stores a control program that is executable by the CPU 201. The RAM 203 is a main storage memory of the CPU 201 and is used as a work area and a temporary storage area for loading various control programs stored in the ROM 202 and the storage 204.

The storage 204 stores print data, image data, various programs, and various types of setting information. While one CPU 201 executes each process illustrated in below-described flowcharts using one memory (the RAM 203) in the MFP 101 according to the present exemplary embodiment, any other form can be employed. For example, a plurality of CPUs, RAMS, ROMs, and storages can cooperate to execute each process illustrated in below-described flowcharts. Further, part of the processes can be executed using a hardware circuit such as an application-specific integrated circuit (ASIC) or a field-programmable gate array (FPGA).

The operation unit I/F 207 is connected to an operation unit 208. The reading unit I/F 209 is connected to the reading unit 210. The reading unit 210 reads an image on a sheet and generates image data. The image data generated by the reading unit 210 is transmitted to an external apparatus, or a printing unit 212 described below prints an image on a sheet based on the image data. Further, the reading unit 210 can read sheets placed on a document feeder (not illustrated) while conveying the sheets one by one.

The printing unit I/F 211 is connected to the printing unit 212 configured to form an image on a sheet. Image data to be printed is transferred to the printing unit 212 via the printing unit I/F 211. The printing unit 212 receives a control command and the image data to be printed and prints an image based on the image data. The printing unit 212 can use an electrophotographic printing method and an inkjet printing method. In the case where the electrophotographic printing method is used, after an electrostatic latent image is formed on a photosensitive member, the formed image is developed with toners, and the toner images are transferred, and the transferred toner images are fixed to thereby form an image. On the other hand, in the case where the inkjet printing method is used, inks are discharged to print an image on a sheet. Consumables such as the toners and the inks to be used in the printing unit 212 are placed in cartridges that are removably attached inside the MFP 101. A user can replenish the MFP 101 with the consumables by replacing the cartridges. Each toner cartridge attached to the printing unit 212 in the present exemplary embodiment includes a sensor configured to detect the remaining amount of toner in the cartridge, and the remaining amount of toner is detected based on a detection result of the sensor. The sensor to be used in detecting the remaining amount of toner can be a sensor of any detection method and, for example, an optical sensor or an capacitance sensor is used. While the remaining amount of toner is detected using a sensor is described as an example in the present exemplary embodiment, a method of calculating the remaining amount of toner is not limited to the above-described method. For example, the remaining amount of toner can be calculated based on the amount of used toner that is calculated from a print job setting.

The MFP 101 is connected to the network 100 via the communication unit I/F 205. The communication unit I/F 205 is communicably connected to the information management server 102 on the network 100 to transmit and receive information about various events that occur in the MFP 101 and information for enabling a service, which will be described below. Further, the communication unit I/F 205 receives print data and information from a personal computer (PC) on the network 100 and transmits consumables-related information, such as the remaining amount of toner and a cartridge model number, that is stored in the RAM 203 or the storage 204, to various servers and PCs.

The print data received via the communication unit I/F 205 is analyzed by a software module (page description language (PDL) analysis unit) (not illustrated) configured to analyze print data stored in the storage 204 or the ROM 202. The PDL analysis unit generates data to be printed by the printing unit 212 based on print data described in various types of PDLs.

The timer processing unit 206 performs time counting processing at the CPU 201 and determines that a predetermined period of time has passed. Further, the timer processing unit 206 performs time management to notify the CPU 201 that the predetermined time has passed based on a user-designated reference time. In the present exemplary embodiment, the timer processing unit 206 is used to detect expiration of communication between the MFP 101 and the information management server 102 and to measure time up to a retry of communication between the MFP 101 and the information management server 102.

Figure 3:
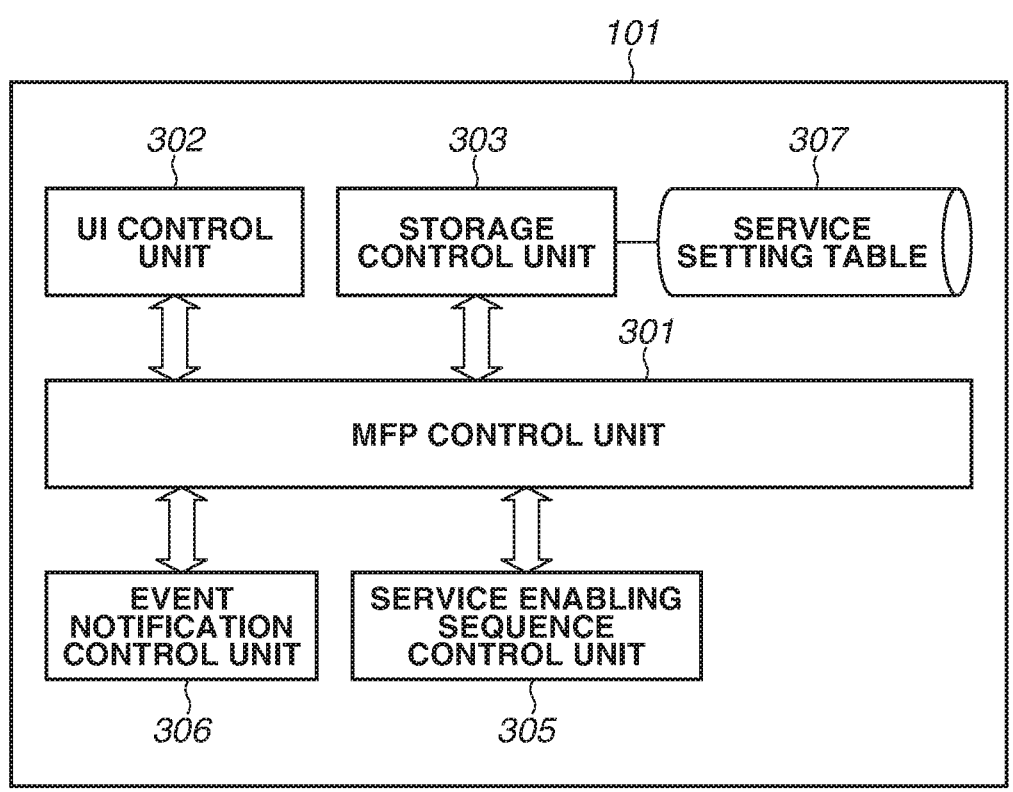
FIG. 3 illustrates an example of a software configuration of the MFP according to an exemplary embodiment of the present disclosure.

FIG. 3 is a block diagram illustrating a software configuration of the MFP 101 according to the present exemplary embodiment. The CPU 201 executes a program to realize a MFP control unit 301, a user interface (UI) control unit 302, a storage control unit 303, an event notification control unit 306, and a service enabling sequence control unit 305 illustrated in FIG. 3.

The MFP control unit 301 controls other modules and comprehensively controls execution of each job that occurs in the MFP 101, such as scan processing, transmission processing, and display processing.

The UI control unit 302 controls the operation unit 208 via the operation unit I/F 207. Specifically, the UI control unit 302 displays a notification to the user and a choice on the operation unit 208 and receives a user operation on the operation unit 208 and transmits the content of the operation to other functional units.

The storage control unit 303 stores designated data in the ROM 202, the RAM 203, or the storage 204 or reads data stored in the ROM 202, the RAM 203, or the storage 204 based on an instruction from other functional units.

In the present exemplary embodiment, the storage control unit 303 manages information in a service setting table 307 stored in the storage 204 of the MFP 101 which is illustrated in FIG. 5D.

The service enabling sequence control unit 305 is a software module configured to execute service enabling processing that will be described below with reference to FIG. 7.

The event notification control unit 306 collects an event that occurs in the MFP 101 and notifies the information management server 102 of the collected event via the communication unit I/F 205. Specific examples of an event include cartridge-related events, such as an event where a toner is consumed by printing, an event where the remaining amount of toner becomes less than the predetermined threshold value, and an event where a cartridge is attached or removed. The event notification control unit 306 notifies the information management server 102 of an event that occurs in the MFP 101, as needed.

A process from entering into a contract for the automatic order service of the toner to actual order according to the present exemplary embodiment will be described below.

First, the user applies for the contract for the automatic order service of the toner. The user applies for the automatic order service of the toner via a delivery agent or a web wage. If the user enters into the contract for the service, a record corresponding to the application is generated in the application information table 400 stored in the information management server 102.

FIG. 4 illustrates an example of the application information table 400 according to the present exemplary embodiment. The application information table 400 is stored in a storage unit of the information management server 102.

The application information table 400 illustrated in FIG. 4 stores a printer identifier (ID) for uniquely identifying the MFP 101, a user ID of the user who manages the MFP 101, a serial number of the MFP 101 for identifying the MFP 101, and a service state, in association with each other. The printer ID is an ID by which the information management server 102 manages the contract. The user ID is an ID for identifying the user who has entered into the contract. The printer serial number is information for identifying the printer for which the service is provided. The service state is information that indicates whether the service is validly set. The application information table 400 can store information about the delivery agent to which the application is submitted and application date and time in addition to the above-described information. Further, in a case where the application information table 400 manages application information about a plurality of types of services, information may be associated therewith that indicates the contract information about the service to which the record in the table corresponds.

If the user applies for the automatic consumables order service, the information management server 102 adds a new record to the application information table 400. At this time, the user ID of the user who has applied and the serial number of the MFP 101 that the user has, are stored in the information management server 102. At this time point, no printer ID is assigned, and the service state is disabled. To use the automatic consumables order service, the user needs to operate the MFP 101 and enable the service. If the user operates the MFP 101 and enables the service, the information management server 102 assigns a printer ID and sets the service state to "enabled".

If the user operates the MFP 101 and sets the service to "disabled", the service state of the application information table 400 is disabled. Further, in a case where the user cancels the contract for the service, the information management server 102 erases the record corresponding to the cancelled contract from the application information table 400.

Other possible services are a maintenance service whereby the state of the MFP 101 is remotely monitored and the MFP 101 is maintained, and a device management service that reports the use situation of a device.

In the example of the application information table 400 illustrated in FIG. 4, the printer ID "123456789" is associated with the application ID "abc123", and the service state of the application ID is "enabled". Further, the printer ID "222222222" is associated with the application ID "xyz789", and the service state of the application ID is "disabled".

FIGS. 5A, 5B, and 5C illustrate an example of a screen that is displayed when the user enables the automatic order service of the toner on the MFP 101. FIG. 5A illustrates a home screen via which the user selects a function to be used. If the user selects a "consumables order setting" 1300 on the home screen, a "consumables order setting" screen illustrated in FIG. 5B is displayed. The "consumables order setting" screen is a screen that allows the user to make a setting as to whether the automatic order function for the toner is to be enabled. An "automatic consumables order setting" 1301 allows the user to make a setting as to whether the automatic order for the toner is to be executed when the remaining amount of the toner becomes less than the threshold value. If the user selects the "automatic consumables order setting" 1301, a screen illustrated in FIG. 5C is displayed on the operation unit 208. FIG. 5C illustrates the screen via which the automatic consumables order function is enabled or disabled. If the user selects "YES" 1302, the MFP 101 enables the automatic consumables order service. On the other hand, if the user selects a "NO" 1303, the MFP 101 disables the automatic consumables order service. If "CLOSE" 1304 on the screen illustrated in FIG. 5C is selected, the MFP 101 does not change the setting of the automatic consumables order service and displays the screen illustrated in FIG. 5B. Information as to whether the automatic consumables order service set via FIG. 5C is enabled or disabled, is stored in the storage 204.

The user can prevent an automatic order for the toner by disabling the setting without cancelling the contract for the automatic order service of the toner. In this way, the user can enable or disable the automatic order function for the toner with ease once a contract is made.

On the screen illustrated in FIG. 5B, if the "automatic consumables order setting" 1301 is enabled, information in the service setting table 307 stored in the storage 204 of the MFP 101 is updated.

FIG. 5D illustrates an example of the service setting table 307 stored in the MFP 101 according to the present exemplary embodiment. The service setting table 307 stores the user ID of the user who manages the MFP 101, a service setting flag, and a service enabling result, in association with each other. The service setting flag indicates whether the automatic consumables order service is enabled. The service enabling result indicates whether the service is successfully enabled.

The service setting flag indicates whether a service setting corresponding to each application ID is set to "ON" or "OFF". The service setting "ON" indicates that the service is enabled by the user. On the other hand, the service setting "OFF" indicates that the service is disabled by the user. The service setting can be changed by, for example, an operation by the user or a service engineer via the operation unit 208 or by receiving an externally-transmitted instruction command to the MFP 101.

The service enabling result indicates a result of service enabling processing performed on the information management server 102. If the user enables the "automatic consumables order setting" 1301, a process illustrated in FIG. 7 is executed. In a case where the service enabling processing illustrated in FIG. 7 is successful, the MFP 101 sets the service enabling result in the service setting table 307, to "successful". The service enabling result is set to "successful" in a case where the service is successfully enabled by a service enabling notification to the information management server 102, whereas the service enabling result is set to "unsuccessful" in a case where the service is unsuccessfully enabled. In a case where no service enabling notification is performed or the service setting is set to "OFF", the service enabling result is set to "unexecuted".

Figure 6:
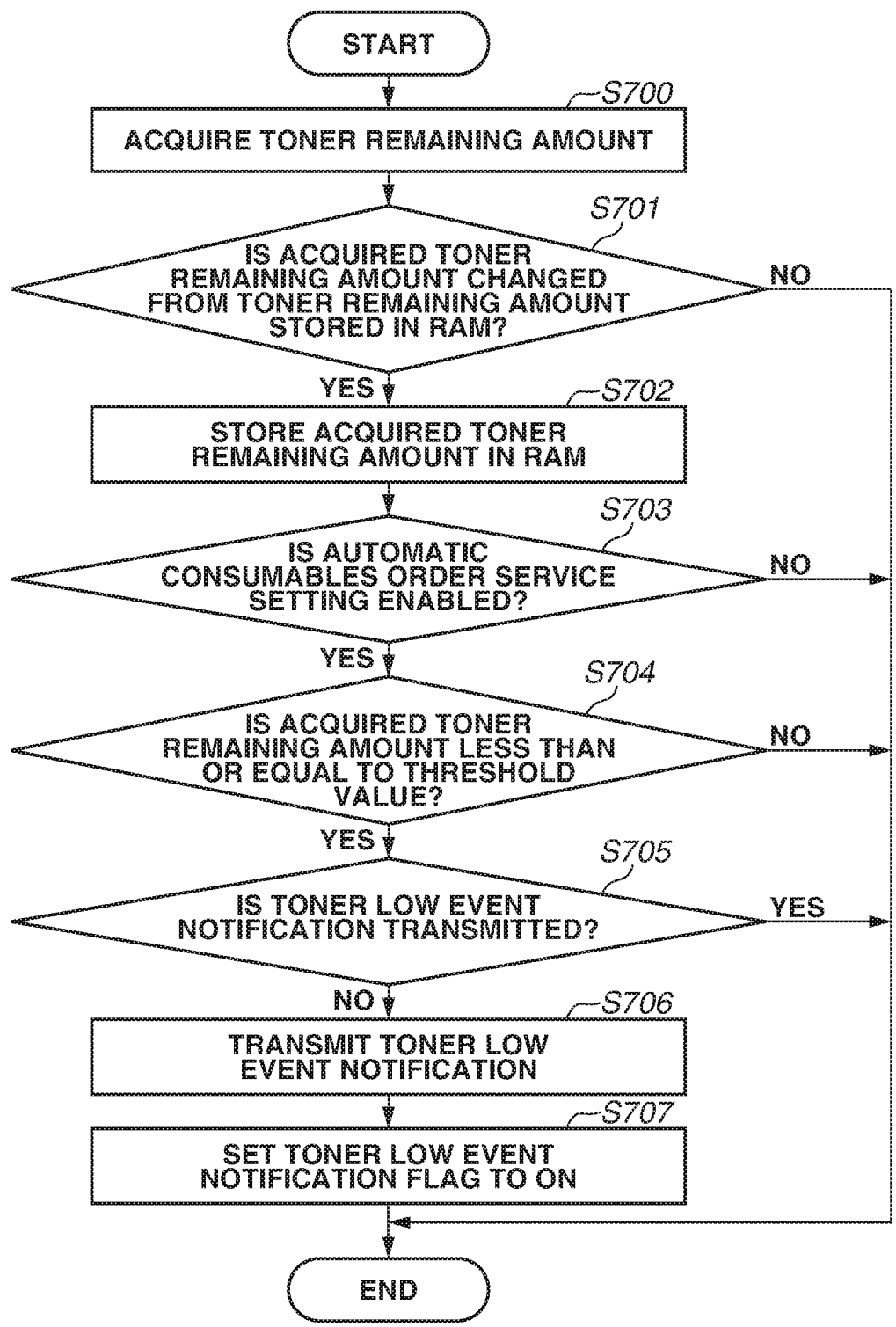
FIG. 6 is a flowchart illustrating a process by the MFP when a change in a remaining amount of toner is detected, according to a first exemplary embodiment.

FIG. 6 is a flowchart illustrating a process that is executed if the printing unit 212 detects a change in the remaining amount of toner. A program for executing the flowchart is stored in the ROM 202, and the CPU 201 executes the program. The process illustrated in FIG. 6 is executed regardless of whether the automatic consumables order service is enabled.

The process illustrated in FIG. 6 is executed for each toner color. The printing unit 212 outputs a notification that there is a change in the remaining amount of toner, to the MFP control unit 301 at a timing of completion of a print job. The MFP control unit 301 starts the process illustrated in FIG. 6 based on the notification from the printing unit 212. The timing of starting the process illustrated in FIG. 6 is not limited to the above-described timing, and the process described below can be executed, for example, at regular intervals or at predetermined time.

In step S700, the MFP control unit 301 acquires the remaining amount of toner from the printing unit 212.

In step S701, the MFP control unit 301 compares the remaining amount of toner that is stored in the RAM 203 with the remaining amount of toner that is acquired in step S700 and determines whether the remaining amount of toner is changed. In a case where the remaining amount of toner is changed (YES in step S701), step S702 and subsequent steps are executed. On the other hand, in a case where the remaining amount of toner is not changed (NO in step S701), the process illustrated in FIG. 6 ends. The case remaining amount of toner is not changed in a case where the toner of the color is not used in an executed print job.

In step S702, the MFP control unit 301 changes the remaining amount of toner that is stored in the RAM 203 to the remaining amount of toner that is acquired in step S700.

In step S703, the MFP control unit 301 determines whether the automatic consumables order service is enabled. The MFP control unit 301 accesses the service setting table 307 via the storage control unit 303. The MFP control unit 301 refers to the service enabling information in the service setting table 307 and determines whether the automatic consumables order service is enabled. In a case where the service enabling information is set to "successful" (YES in step S703), the processing proceeds to step S704. On the other hand, in a case where the service enabling information is set to "unsuccessful" or "unconnected" (NO in step S703), the process illustrated in FIG. 6 ends.

In the case where the service is enabled, in step S704, whether the remaining amount of toner is less than or equal to the threshold value is determined. The MFP control unit 301 accesses the RAM 203 and determines whether the remaining amount of toner that is stored in the RAM 203 in step S702 is less than or equal to the predetermined threshold value. The process is changed based on the determination result in step S704. In a case where the remaining amount of toner is less than or equal to the threshold value (YES in step S704), the processing proceeds to step S705. On the other hand, in a case where the remaining amount of toner is greater than the threshold value (NO in step S704), the process illustrated in FIG. 6 ends.

In step S705, the MFP control unit 301 determines whether a toner-low event notification has been transmitted to the information management server 102. A flag that indicates whether a toner-low event notification has been transmitted is stored in the RAM 203. The flag is set to ON if there is a change from a state where the remaining amount of toner is greater than the threshold value to a state where the remaining amount of toner is less than the threshold value. The flag is set to OFF if the toner is replaced or replenished. In step S705, in a case where the flag is already ON (YES in step S705), a toner-low event notification has been previously transmitted to the information management server 102 and placement of an order for the toner is completed. Thus, the MFP 101 does not transmit a toner-low event notification to the information management server 102, and the process illustrated in FIG. 6 ends.

On the other hand, in a case where the toner-low event notification flag is OFF (NO in step S705), in step S706, the MFP control unit 301 controls the event notification control unit 306 and transmits a toner-low event notification to the information management server 102.

Then, in step S707, the MFP control unit 301 sets the toner-low event notification flag to ON. The toner-low event notification flag is cleared based on a predetermined condition and is set to OFF. The predetermined condition is that, for example, the consumable has been replaced or replenished.

In the present exemplary embodiment, the determination order of steps S702, S703, and S704 can be changed. The apparatus only has to be configured such that the MFP 101 transmits a toner-low event to the information management server 102 in a case where three conditions are satisfied, that is, a toner-low event has not previously been transmitted to the information management server 102, the remaining amount of toner is less than or equal to the threshold value, and the service is enabled.

Next, a sequence of the processing for enabling the automatic consumables order service will be described below with reference to FIG. 7, which is executed if the user changes the setting of the automatic consumables order service from "disabled" to "enabled".

In step S603, the MFP 101 transmits a device registration request to the information management server 102. The MFP 101 transmits information for identifying the MFP 101, such as the serial number, product name, or product destination of the MFP 101, to the information management server 102. The information management server 102 identifies the record that corresponds to the MFP 101 from the application information table 400 based on the serial number of the MFP 101 that is contained in the received device registration request. In step S604, the information management server 102 issues a printer ID by which the information management server 102 manages the printer and notifies the MFP 101 of the printer ID as device registration result information.

In step S605, the MFP 101 transmits an application information request to the information management server 102. If the information management server 102 acquires the application information request, then in step S606, the information management server 102 reads information associated with the MFP 101 and transmits the application ID as application information to the MFP 101. In the present exemplary embodiment, the automatic consumables order service is the only service managed by the information management server 102. In a case where the information management server 102 manages information about a plurality of services, a notification of the service ID that indicates the type of the service for which the MFP 101 applies can be transmitted to the MFP 101. Further, in a case where the automatic consumables order services is conducted for a plurality of types of consumables, a notification of information that indicates a type of consumables for which the contract for the automatic order is made can be transmitted to the MFP 101.

In step S607, the MIT 101 transmits a service enabling notification to the information management server 102 to set a service state in an application information management table to "enabled". In step S608, the information management server 102 sets the service state in the application information management table to "enabled" and transmits service enabling result information that indicates that the enabling is completed, to the MFP 101.

In step S609, the MFP 101 transmits a request for device control information to the information management server 102. The device control information is information that indicates an event to be transmitted to the information management server 102 and a timing of transmitting the event when the MFP 101 uses the enabled service.

In step S610, the information management server 102 transmits a notification of the device control information that indicates information to be transmitted and the tuning of transmitting the information when the MFP 101 uses the enabled service to the MFP 101. For example, in a case where the automatic order for the toner is placed, when the MFP 101 detects a toner-low event, if a toner-low event notification has yet to be transmitted to the information management server 102, information that indicates that a toner-low event notification is to be transmitted is transmitted to the MFP 101. In step S610, the information management server 102 transmits an event information collection instruction together with the device control information to the MFP 101. The MFP 101 transmits a notification of an event collected according to the device control information based on the event information collection instruction, to the information management server 102.

Through the above-described process, the service enabling processing between the MFP 101 and the information management server 102 is completed.

There are cases where replacement of a consumable is already necessary when the user sets the automatic consumables order service of the consumable to "enabled". For example, the remaining amount of toner is already less than the threshold value when the user enables the automatic consumables order service. In order to enable prompt transmitting of an automatic consumables order even in the above-described case, the image forming apparatus according to the present exemplary embodiment executes a process illustrated in FIG. 8 after the process of enabling the service in FIG. 7 is completed. In this way, in the case where replacement of a consumable is already necessary when the automatic consumables order service of the consumable is enabled, an order for the consumable is promptly transmitted.

Figure 7:
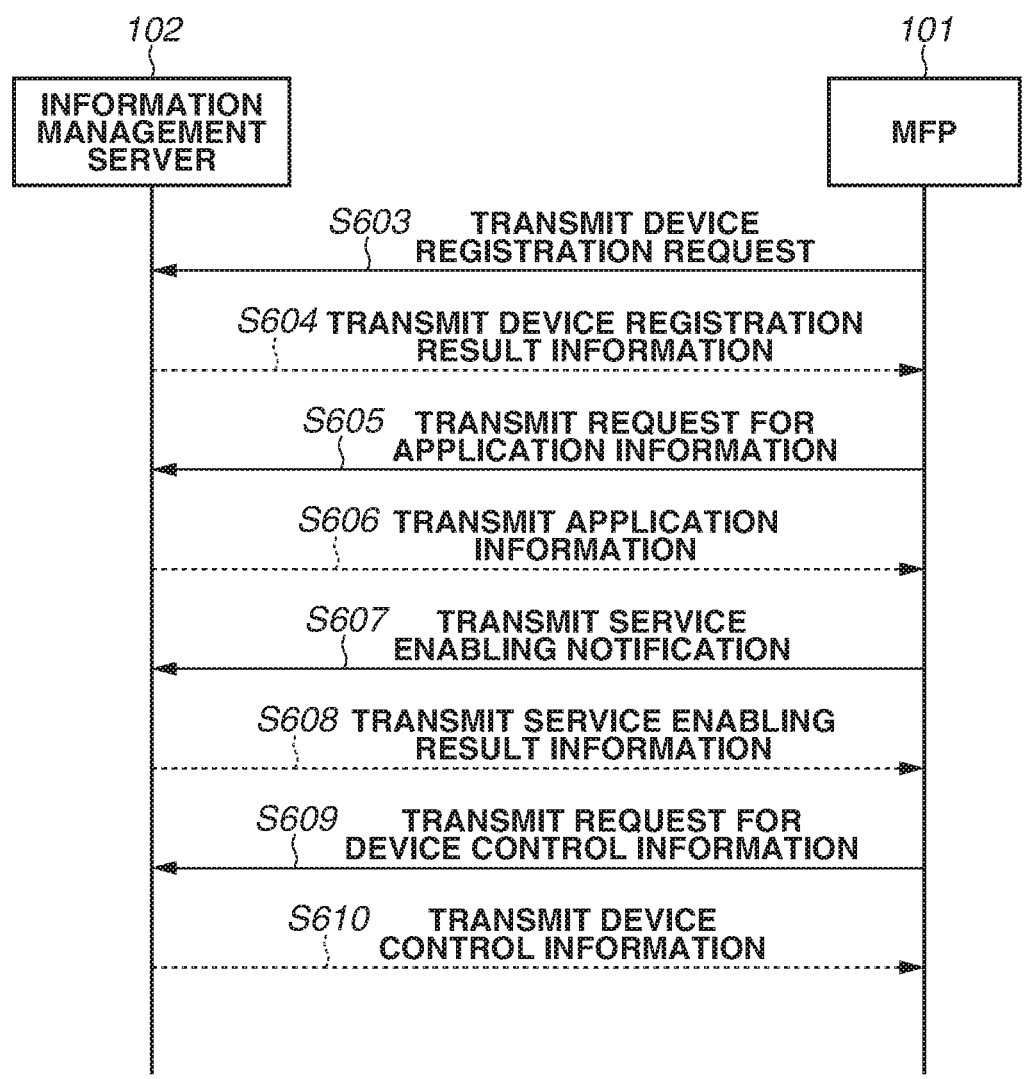
FIG. 7 illustrates a sequence of service enabling processing with respect to an information management server according to the first and second exemplary embodiments.
Figure 8:
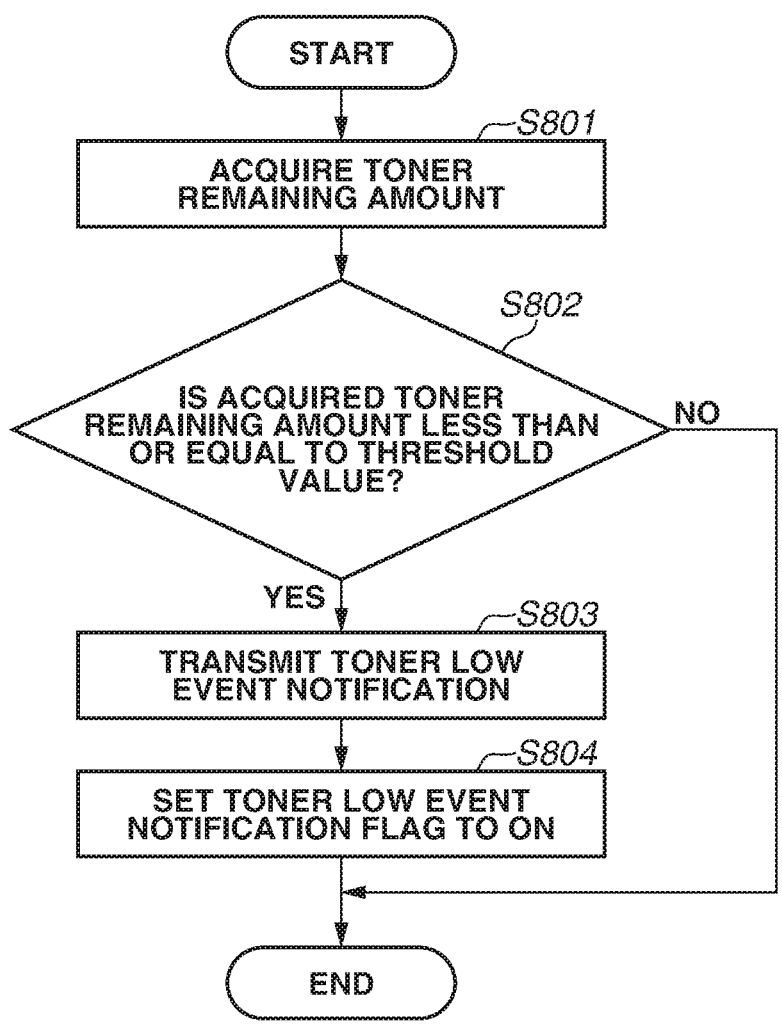
FIG. 8 is a flowchart illustrating a process by the MFP when a service setting is changed, according to the first exemplary embodiment.

FIG. 8 is a flowchart illustrating the process that is executed after the process of enabling the automatic consumables order service in FIG. 7 is completed. A program for executing the process illustrated in the flowchart is stored in the ROM 202, and the CPU 201 reads the program and executes the read program. The process illustrated in FIG. 8 is started when the information management server 102 notifies the MFP 101 of the device control information and the MFP 101 stores the device control information in the memory. Alternatively, the CPU 201 of the MFP 101 can start the process illustrated in FIG. 8 based on a notification of an event information collection instruction from the information management server 102.

In step S801, the MFP control unit 301 acquires the remaining amount of toner that is stored in the RAM 203. In the present exemplary embodiment, the MFP control unit 301 acquires the remaining amount of toner that is stored in the RAM 203 in step S702 in FIG. 6. Alternatively, in step S501, the MFP control unit 301 may acquire the current remaining amount of toner from the printing unit 212.

In step S802, the MFP control unit 301 determines whether the read remaining amount of toner is less than or equal to the threshold value. The threshold value used in step S802 is a value that can be set by the user via a screen (not illustrated).

In a case where the remaining amount of toner is greater than the threshold value (NO in step S802), the process illustrated in FIG. 8 ends. On the other hand, in a case where the remaining amount of toner is less than or equal to the threshold value (YES in step S802), in step S803, the MFP control unit 301 controls the event notification control unit 306 and transmits a toner-low event notification to the information management server 102. The notification is transmitted in step S803 so that the information management server 102 is notified that an order for the toner cartridge needs to be transmitted. While the user is notified of a toner-low event in the case where the remaining amount of toner is less than or equal to the threshold value in the present exemplary embodiment, if the user already places an order for the toner, it is also possible to transmit no toner-low event notification. For example, in a case where the user places an order for the toner via the operation unit 208 of the MFP 101, the MFP control unit 301 sets the toner-low event notification flag stored in the RAM 203 to ON. In step S802, in the case where the remaining amount of toner is less than or equal to the threshold value, the MFP control unit 301 checks the toner-low event notification flag stored in the RAM 203, and if the toner-low event notification flag is OFF, a toner-low event notification may be transmitted to the information management server 102.

With the method according to the present exemplary embodiment, an order for a consumable is promptly placed in a case where an automatic consumables order service is enabled in a state where the MFP 101 already needs replacement of the consumable.

A second exemplary embodiment will be described below. In the first exemplary embodiment, the user cannot know a timing that an order for a toner is transmitted in the case where the automatic consumables order function is enabled. An image forming apparatus according to the second exemplary embodiment makes it possible for the user to know when an automatic order for a consumable is transmitted. Further, in the second exemplary embodiment, the user can select whether to transmit an automatic order at the timing that the automatic order is transmitted.

In the present exemplary embodiment, the configurations illustrated in FIGS. 1 to 5 and 7 are similar to those in the first exemplary embodiment. Only a difference from the first exemplary embodiment will be described below.

Figure 9:
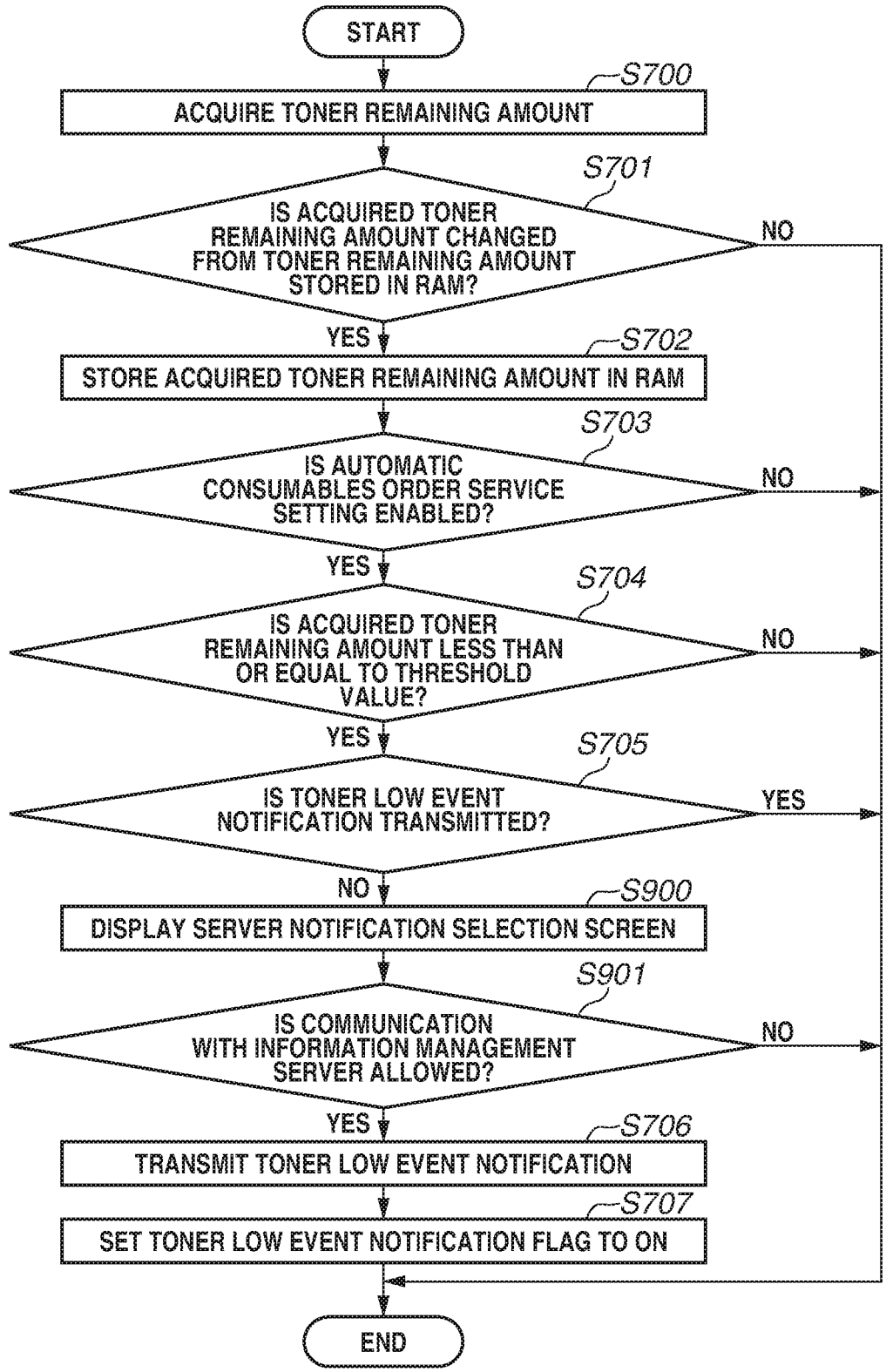
FIG. 9 is a flowchart illustrating a process by the MFP when a change in a remaining amount of toner is detected, according to a second exemplary embodiment.

FIG. 9 is a flowchart illustrating a process that is started if the MFP control unit 301 is notified of a change in the remaining amount of toner by the printing unit 212, in the second exemplary embodiment. If a print job is completed, the printing unit 212 notifies the MFP control unit 301 of a change in the remaining amount of toner. A program for executing the process illustrated in FIG. 9 is stored in the ROM 202, and the CPU 201 executes the program to realize the process. In the description below, the processing that is similar to the processing in FIG. 6 is given the same reference numeral, and only a difference from FIG. 6 will be described below.

In step S705, if toner-low event notification is not transmitted (NO in step S705), then in step S900, the MFP control unit 301 displays an information notification allowance screen illustrated in FIG. 10 which is directed to the information management server 102. FIG. 10 illustrates an example of the information notification allowance screen that is produced on a display of the operation unit 208 in step S900. The information notification allowance screen is a screen that prompts the user to select whether to notify the information management server 102 of the state of a consumable in a case where an order for the consumable is necessary. While in FIG. 10, the screen prompts the user to select whether to notify the information management server 102 of information about the remaining amount of toner, the screen may prompt the user to select whether to order the consumable.

In step S901, the MFP control unit 301 determines whether communication with the information management server 102 is allowed. In a case where the user selects "YES" 1001 on the information notification allowance screen, the MFP control unit 301 determines that communication with the information management server 102 is allowed. On the other hand, in a case where "NO" 1002 is selected on the information notification allowance screen, the MFP control unit 301 determines that communication with the information management server 102 is not allowed. In the case where communication with the information management server 102 is not allowed (NO in step S901), the process illustrated in FIG. 9 ends. On the other hand, in the case where communication with the information management server 102 is allowed (YES in step S901), the processing proceeds to step S706, and the MFP control unit 301 transmits a toner-low event notification to the information management server 102.

Figure 11:
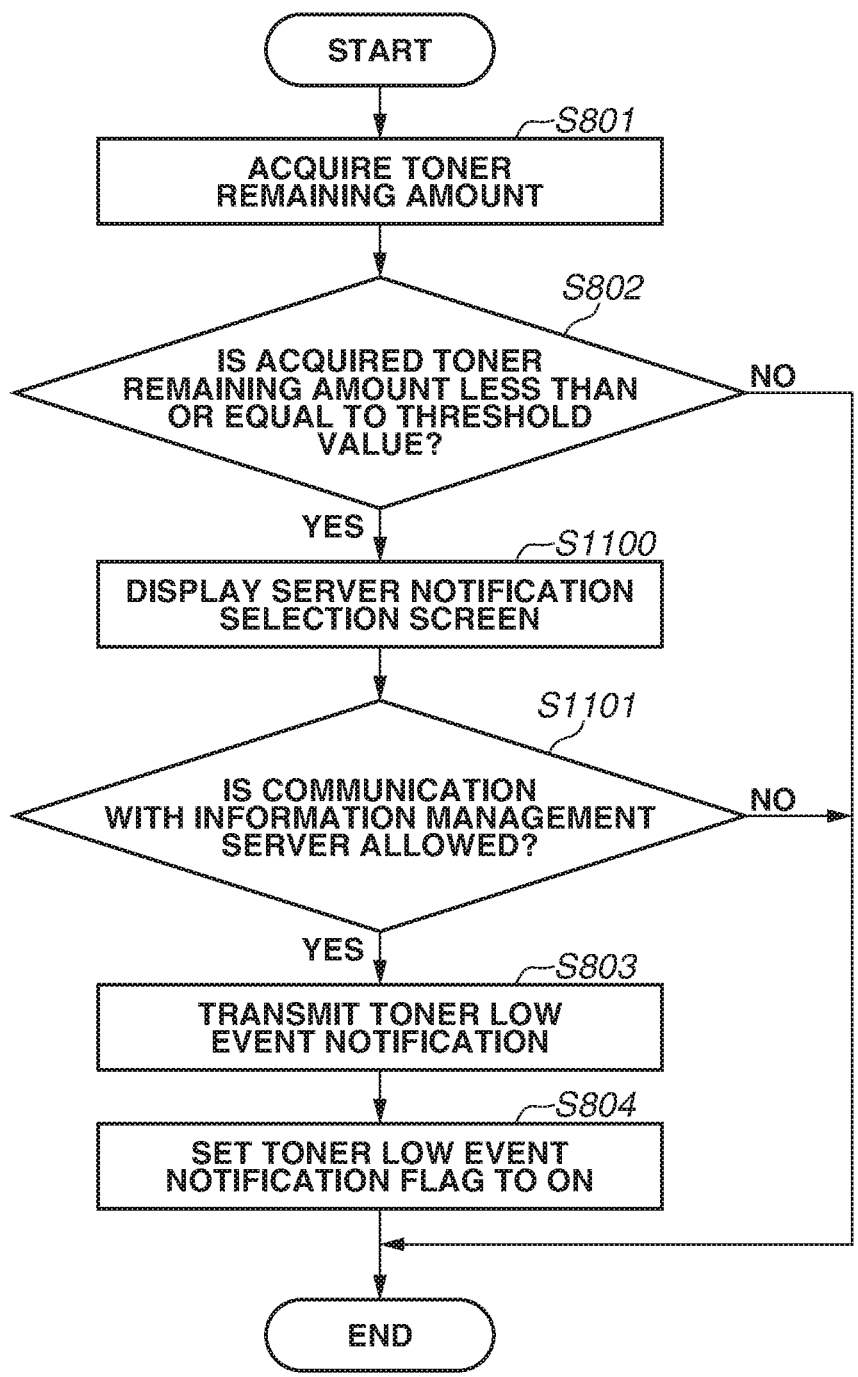
FIG. 11 is a flowchart illustrating a process by the MFP when a service setting is changed, according to the first exemplary embodiment.

FIG. 11 is a flowchart illustrating a process that is executed if the process of enabling the automatic consumables order service in FIG. 7 is completed in the second exemplary embodiment. A program for executing the process illustrated in the flowchart is stored in the ROM 202, and the CPU 201 executes the program to realize the process. The processing that is similar to the processing in FIG. 8 is given the same reference numeral, and only a difference from FIG. 8 will be described below.

In a case where the acquired remaining amount of toner is less than or equal to the threshold value (YES in step S802), in step S1100, the MFP control unit 301 displays a screen that prompts the user to select whether or not to allow notification of information to the information management server 102. The screen displayed on the operation unit 208 in step S1100 is similar to the screen displayed on the operation unit 208 in step S900 in FIG. 9.

In step S1101, after a user operation is received, the MFP control unit 301 determines whether communication with the information management server 102 is allowed. The determination in step S1101 is similar to the determination in step S901 in FIG. 9.

The above-described configuration makes it possible to check with the user whether an order for toner as to the currently-attached cartridge is to be transmitted. In the second exemplary embodiment, whether the toner-low event notification is to be transmitted to the information management server 102 is checked with the user before the toner-low event notification is transmitted to the information management server 102 in each of the processes illustrated in FIGS. 9 and 11. Alternatively, the toner-low event notification to the information management server 102 may be transmitted only in one of the processes illustrated in FIGS. 9 and 11. For example, the information notification allowance screen illustrated in FIG. 10 is displayed only when the user enables the automatic consumables order service, and the information notification allowance screen is not displayed in the process illustrated in FIG. 9. In this way, an automatic order for a consumable is transmitted without checking with the user in a case where a toner-low event occurs in normal use, and whether to transmit an order is checked with the user at a timing that the user enables the automatic order service.

With the above-described methods according to the present exemplary embodiment, a notification of information about a change in the amount of remaining consumable can be transmitted to the server as appropriate even if the automatic order service is enabled in a state where the amount of remaining consumable in the MFP 101 is already less than or equal to the predetermined threshold value. Furthermore, whether to transmit an order for toner as to the currently-attached cartridge is checked with the user depending on a condition so that the consumable is ordered at a more appropriate timing.

Other Exemplary Embodiment

In the above-described exemplary embodiments, the toner cartridge is described as an example of a consumable that is automatically ordered. The consumable that is automatically ordered is not limited to the toner. Other examples of the consumable that is automatically ordered include the photosensitive drum of the printing unit 212, rollers that convey a sheet in the printing unit 212, and document conveyance rollers of the document feeder of the reading unit 210. In a case where the photosensitive drum or various rollers are to be automatically ordered, an automatic order is transmitted based on the number of days that have passed since the date of attachment of the parts, or the operation time of the parts. For example, in a case where the number of days that have passed since the date of attachment of the photosensitive drum reaches a predetermined number of days, an automatic order request event is transmitted to the information management server 102. An inkjet MFP or printer uses ink as a consumable. In the case of the inkjet MFP or printer, an ink tank can be ordered automatically in place of the toner cartridge.

The present disclosure is also realized by the process described below. That is, software (program) configured to realize the functions of the above-described exemplary embodiments is supplied to a system or apparatus via a network or various storage mediums, and a computer (or a CPU or micro-processing unit (MPU)) of the system or apparatus reads a program code and executes the read program code. In this case, the computer program and the storage medium that stores the computer program are also encompassed in the scope of the disclosure.

With each image forming apparatus disclosed herein, a notification of a state of the image forming apparatus can be transmitted to a server for an automatic order service so that an automatic order for a consumable can be transmitted based on the state of the consumable at the time when the user enables the automatic order service of the consumable.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-036853, filed Feb. 28, 2019, which is hereby incorporated by reference herein in its entirety.

What is claimed is:

1. An image forming apparatus that communicates with a server, the image forming apparatus comprising:
   one or more processors which executes instructions to cause the image forming apparatus to function as:
   an acquisition unit configured to acquire a state of a consumable in the image forming apparatus;
   a first detection unit configured to detect a change of the state of the consumable from a first state indicating that an amount of the consumable is greater than a threshold to a second state indicating that an amount of the consumable is less than the threshold;
   an enabling unit configured to enable a service that transmits a notification to a server so that a new consumable is ordered;
   a second detection unit configured to detect a change of a state of the service from a disabled state to an enabled state;
   a control unit configured to control a transmission unit to transmit the notification to the server based on the first detection unit detecting the change of the state of the consumable in a situation that the state of the service is the enabled state, and the transmission unit to transmit the notification to the server based on the second detection unit detecting the change of the state of the service in a situation that the state of the consumable is the second state.

2. The image forming apparatus according to claim 1, further comprising a determination unit configured to determine whether the acquired state of the consumable satisfies a predetermined condition,
   wherein the transmission unit transmits the notification to the server based on a result of the determination indicating that the predetermined condition is satisfied.

3. The image forming apparatus according to claim 1, further comprising an image forming unit configured to form an image on a sheet using a recording agent,
   wherein the consumable is the recording agent.

4. The image forming apparatus according to claim 3,
wherein the acquisition unit acquires a remaining amount of the recording agent, and
wherein the transmission unit transmits the notification to the server if the remaining amount of the recording agent that is acquired by the acquisition unit is less than a threshold value.

5. The image forming apparatus according to claim 4, further comprising a determination unit configured to determine whether the state of the consumable satisfies a predetermined state by comparing the remaining amount of the recording agent that is acquired by the acquisition unit with a predetermined threshold value.

6. The image forming apparatus according to claim 5, wherein the threshold value is a value that is settable by a user.

7. The image forming apparatus according to claim 4, wherein the acquisition unit acquires the remaining amount of the recording agent when a job that causes an image to be formed on a sheet by the image forming unit is completed.

8. The image forming apparatus according to claim 1, further comprising a storage that stores information acquired by the acquisition unit,
wherein in a case where the acquired state of the consumable is different from a state of the consumable stored in advance in the storage, the transmission unit transmits the notification based on the acquired state of the consumable.

9. The image forming apparatus according to claim 1, wherein the transmission unit transmits the notification based on information that indicates whether the notification has previously been transmitted.

10. The image forming apparatus according to claim 9, wherein in a case where the notification has previously been transmitted, the transmission unit does not transmit the notification to the server even if the state of the consumable satisfies a predetermined condition.

11. The image forming apparatus according to claim 9, wherein the information indicating whether the notification has previously been transmitted is set as not previously transmitted when the consumable is replaced.

12. The image forming apparatus according to claim 1, further comprising a display unit configured to display an image,
wherein the display unit displays a screen which whether the transmission unit is to transmit, based on the state of the consumable that is acquired by the acquisition unit, a notification of an event is selected.

13. The image forming apparatus according to claim 1, wherein through the service, the consumable is ordered based on the state of the consumable without a user instruction ordering the consumable.

14. The image forming apparatus according to claim 1,
wherein information about the notification that is transmitted by the transmission unit is acquired from the server, and
wherein if the information about the notification is acquired, the transmission unit transmits the notification based on the information acquired by the acquisition unit.

15. The apparatus according to claim 1, wherein the control unit is configured not to control the transmission unit to transmit the notification to the server in a situation that the state of the service is the enabled state and the state of the consumable is the second state in a case that the change of the state of the consumable is not detected by the first detection unit and the change of the state of the service is not detected by the second detection unit.

16. The apparatus according to claim 1, wherein once the notification is transmitted to the server for the consumable, it is recorded that the transmission of the notification for the consumable has been done, and the control unit is configured not to control the transmission unit to transmit the notification to the server in a situation that it is recorded that the transmission has been done for the consumable and the consumable is still attached to the apparatus.

17. A method of controlling an image forming apparatus that communicates with a server, the method comprising:
acquiring a state of a consumable in the image forming apparatus;
detecting a change of the state of the consumable from a first state indicating that an amount of the consumable is greater than a threshold to a second state indicating that an amount of the consumable is less than the threshold;
enabling a service that transmits a notification to a server so that a new consumable is ordered;
detecting a change of a state of the service from a disabled state to an enabled state;
controlling to transmit the notification to the server based on detecting the change of the state of the consumable in a situation that the state of the service is the enabled state, and to transmit the notification to the server based on detecting the change of the state of the service in a situation that the state of the consumable is the second state.

18. A non-transitory computer-readable storage medium that stores a program for executing a method of controlling an image forming apparatus that communicates with a server, the method comprising:
acquiring a state of a consumable in the image forming apparatus;
detecting a change of the state of the consumable from a first state indicating that an amount of the consumable is greater than a threshold to a second state indicating that an amount of the consumable is less than the threshold;
enabling a service that transmits a notification to a server so that a new consumable is ordered;
detecting a change of a state of the service from a disabled state to an enabled state;
controlling to transmit the notification to the server based on detecting the change of the state of the consumable in a situation that the state of the service is the enabled state, and to transmit the notification to the server based on detecting the change of the state of the service in a situation that the state of the consumable is the second state.

* * * * *